United States Patent
Spencer (10) Patent No.: US 10,183,557 B2
(45) Date of Patent: Jan. 22, 2019

(54) DIMMABLE SUNVISOR

(71) Applicant: Faraday & Future Inc., Gardena, CA (US)

(72) Inventor: Charles Edward Spencer, Long Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 131 days.

(21) Appl. No.: 15/269,671

(22) Filed: Sep. 19, 2016

(65) Prior Publication Data

US 2017/0080782 A1 Mar. 23, 2017

Related U.S. Application Data (60) Provisional application No. 62/221,748, filed on Sep. 22, 2015.

(51) Int. Cl.
*B60J 3/04* (2006.01)
*B60J 3/02* (2006.01)

(52) U.S. Cl.
CPC ............... *B60J 3/04* (2013.01); *B60J 3/0278* (2013.01)

(58) Field of Classification Search
CPC .................................. B60J 3/04; B60J 3/0278
USPC ......................................................... 296/97.2
See application file for complete search history.

(56) References Cited

U.S. PATENT DOCUMENTS

| | | | |
|---|---|---|---|
| 6,811,201 B2 | 11/2004 | Naik | |
| 7,134,707 B2 | 11/2006 | Isaac | |
| 8,902,486 B1 | 12/2014 | Chandrasekhar | |
| 2007/0133078 A1 | 6/2007 | Fanton et al. | |
| 2011/0170030 A1 | 7/2011 | Boote | |
| 2014/0239664 A1* | 8/2014 | Newman | B60J 3/04 296/97.2 |

FOREIGN PATENT DOCUMENTS

| | | |
|---|---|---|
| CN | 102209831 | 10/2011 |
| CN | 104002645 A | 8/2014 |
| JP | 357055219 A * | 4/1982 |
| JP | 402109723 A * | 4/1990 |
| JP | 19880261911 A | 4/1990 |

\* cited by examiner

*Primary Examiner* — Joseph D. Pape
(74) *Attorney, Agent, or Firm* — Veros Legal Solutions, LLP (57) ABSTRACT

A dimmable visor is disclosed. In one embodiment, the visor includes a first clear sheet having a first surface and an electro-opaque sheet having a first surface and a second surface and having adjustably variable transparency. The first surface of the electro-opaque sheet is in contact with the first surface of the first clear sheet. The visor also includes a pair of transparent electrodes disposed on two opposite edges of the electro-opaque sheet, each of the transparent electrodes having an area smaller than the electro-opaque sheet. The visor also includes a second clear sheet having a first surface in contact with the second surface of the electro-opaque sheet. The visor also includes a suspension hinge attached to one edge of the first clear sheet and is configured to rotate about the suspension hinge. The electro-opaque sheet changes its transparency in response to electrical energy being applied to the electro-opaque sheet.

19 Claims, 6 Drawing Sheets

DIMMABLE SUNVISOR

RELATED APPLICATION

The application is based upon and claims priority to U.S. Provisional Application 62/221,748, filed on Sep. 22, 2015, the contents of which are incorporated herein by reference in their entirety.

FIELD OF THE INVENTION

The invention relates generally to solar glare blocking systems and more specifically to electronic sun blocking devices.

BACKGROUND OF THE INVENTION

Driving in the direction of the sun when it is near the horizon results in what is generally termed solar glare. Solar glare partially or totally blinds the driver as the driver's eyes attempt to compensate for the increased light intensity directed directly at the driver. The result is generally a markedly decreased road speed or worse, accidents that occur when the driver fails to become aware of objects in the automobile's path.

To reduce solar glare, automobiles have for many years come equipped with opaque visors that the driver rotates into the line of sight between the driver's eyes and the sun. These visors are typically on a two axis hinge that allows the visor to rotate about a vertical and a horizontal axis. By rotating the visor about the horizontal axis, the driver can block more or less sunlight coming through the windshield of the automobile. As the visor is rotated at a greater angle, more of the windshield is obscured and the driver is left with a smaller portion of the windshield to view through.

A variation of such a visor includes a transparent visor that includes multiple colored filters that are placed over the transparent visor. These filters typically are made from a semitransparent plastic material that filters out some portion of the light. By adding additional filters or darker filters, the driver can reduce the amount of sunlight without reducing the viewing window. Such visor filters have fixed increments of opacity and must be adjusted by hand, which is problematic when the position and intensity of the sunlight varies as the sun traces its path through the sky.

The present invention addresses these requirements.

SUMMARY OF THE INVENTION

One aspect of the invention relates to a dimmable visor. In one embodiment, the visor includes a first clear sheet having a first surface and an electro-opaque sheet having a first surface and a second surface and having adjustably variable transparency. In one embodiment, the first surface of the electro-opaque sheet is in contact with the first surface of the first clear sheet. The visor also includes a pair of transparent electrodes disposed on two opposite edges of the electro-opaque sheet, each of the transparent electrodes having an area smaller than that of the electro-opaque sheet. The visor also includes a second clear sheet having a first surface. In one embodiment, the first surface of the second clear sheet is in contact with the second surface of the electro-opaque sheet. In one embodiment, the visor includes a suspension hinge attached to one edge of the first clear sheet. In one embodiment, the dimmable visor is configured to rotate about the suspension hinge. In still another embodiment, the electro-opaque sheet changes its transparency in response to electrical energy being applied to the electro-opaque sheet.

In one embodiment, the dimmable visor further includes drive electronics in electrical communication with the electro-opaque sheet. In one embodiment, the dimmable visor includes a user interface in electrical communication with the drive electronics. In one embodiment, wherein the first clear polymer sheet and the second clear polymer sheet comprise transparent electrodes. In one embodiment, the dimmable visor further includes transparent electrodes disposed on two edges of the electro-opaque sheet. In one embodiment, the electro-opaque sheet comprises a suspended particle device. In one embodiment, the electro-opaque sheet comprises an electrochromic device. In one embodiment, the first and second clear sheets are transparent polymers. In one embodiment, the first and second clear sheets are glass.

In one embodiment, the electro-opaque sheet includes an electrochromophoric device. In one embodiment, the drive electronics applies a periodic voltage pulse to the electro-chromophoric device. In one embodiment, the drive electronics are in electrical communication with one or more photocells.

Another aspect of the invention includes a dimmable windshield. In one embodiment, the dimmable windshield includes a windshield, and an electro-opaque sheet having a variable transparency. In one embodiment, the dimmable windshield further includes a pair of transparent electrodes disposed on two opposite edges of the electro-opaque sheet, each of the transparent electrodes having an area smaller than that of the electro-opaque sheet. In one embodiment, a first surface of the electro-opaque sheet is in contact with the windshield. In one embodiment, the dimmable windshield includes a clear sheet in contact with the second surface of the electro-opaque sheet. In one embodiment, the electro-opaque changes its transparency in response to electrical energy being applied to the electro-opaque sheet.

In one embodiment, the electro-opaque sheet covers less than 100% of the windshield. In another embodiment, the electro-opaque sheet changes its transparency in response to electrical energy being applied to electro-opaque sheet. In one embodiment, the dimmable windshield further includes drive electronics in electrical communication with the electro-opaque sheet. In one embodiment, a user interface is in electrical communication with the drive electronics. In still another embodiment, the user interface is located in a dashboard. In one embodiment, the user interface is located in a steering wheel. In one embodiment, the dimmable windshield further includes one or more photocells in electrical communication with the drive electronics.

Another aspect of the invention includes a vehicle. In one embodiment, the vehicle includes a dimmable visor that includes a windshield, and an electro-opaque sheet having a variable transparency. In one embodiment, a first surface of the electro-opaque sheet being disposed on the windshield. The dimmable visor also includes a pair of transparent electrodes disposed on two opposite edges of the electro-opaque sheet, the transparent electrodes having an area smaller than that of the electro-opaque sheet. In one embodiment, the dimmable windshield includes a clear sheet in contact with the second surface of the electro-opaque sheet. In one embodiment, the electro-opaque changes its transparency in response to electrical energy being applied to the electro-opaque sheet.

In one embodiment, the vehicle includes a pair of transparent electrodes disposed on two edges of the electro-opaque sheet. In one embodiment, the vehicle includes drive electronics in electrical communication with the electro-opaque sheet. In one embodiment, the vehicle includes at least one of a dash board and a steering wheel that houses an user interface in electrical communication with the drive electronics. In one embodiment, the vehicle includes one or more photocells in electrical communication with the drive electronics.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Figure 1:
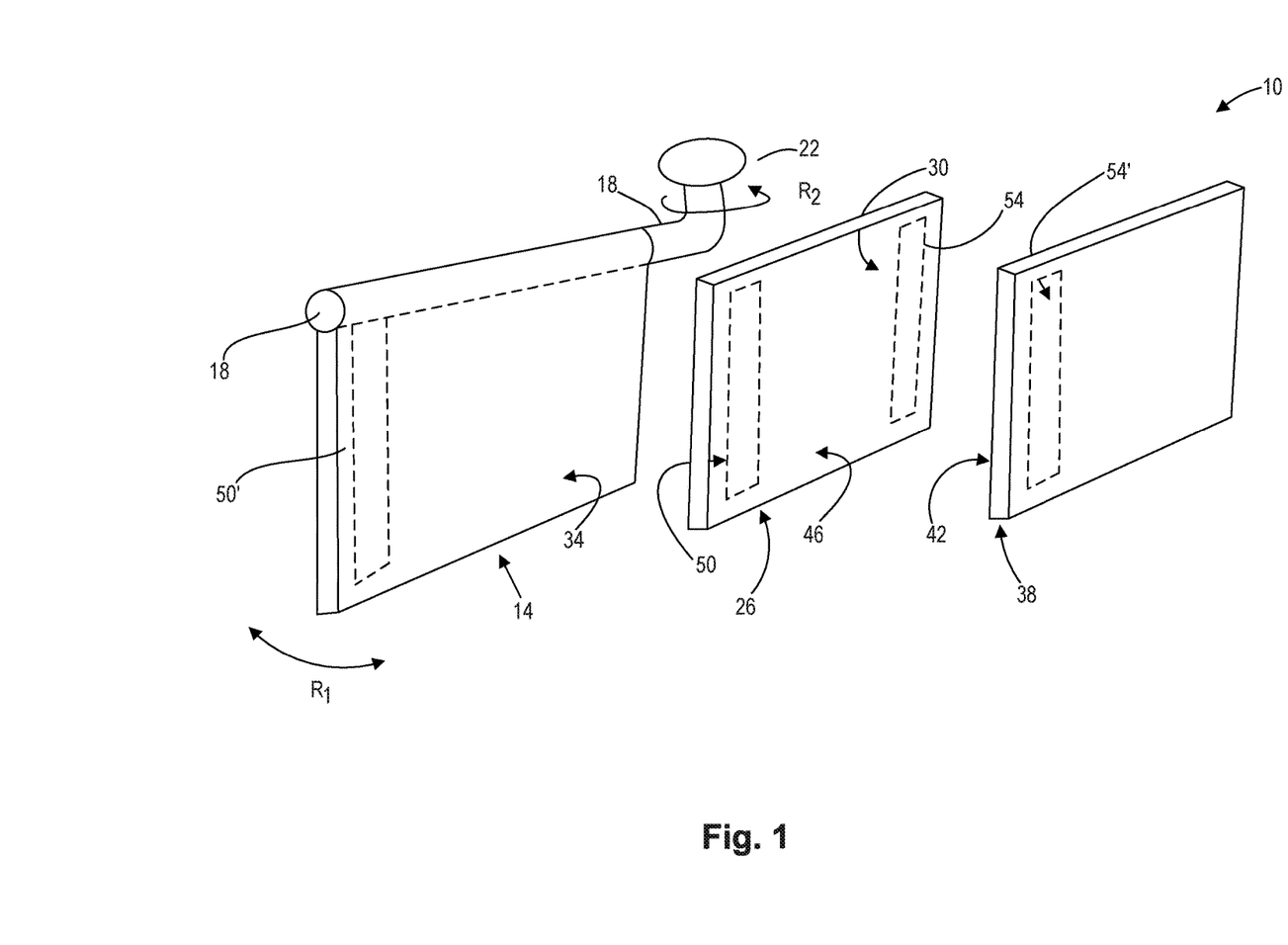
FIG. 1 is a highly schematic exploded diagram of a visor constructed in accordance with the invention.

Referring to FIG. 1, a visor 10 constructed in accordance with an embodiment of the invention includes a first clear polymer sheet 14. The first clear polymer sheet 14 may be made of any suitable plastic, such as optical grade polycarbonate. Alternatively, the clear polymer sheet may be replaced with shatter-resistant glass. The first sheet 14 is rotatably attached to a rod 18 that allows the first sheet 14 to rotate in the direction shown by the arrow $R_1$. The rod 18 is bent and is rotatably attached to a suspension hinge or swivel 22 which is generally connected to the region of the windshield. The suspension hinge 22 allows the rod 18 to rotate about a generally vertical axis shown by arrow $R_2$.

The second layer of the visor 10 is an electro-opaque sheet 26 having adjustably variable transparency. A first surface 30 of the electro-opaque sheet 26 is in contact with the first surface 34 of the first clear sheet 14. The visor 10 also includes a second clear sheet 38. The first surface 42 of the second clear sheet 38 is in contact with the second surface 46 of the electro-opaque sheet 26.

In one embodiment, transparent electrodes 50 and 54, each attached to a respective surface of the electro-opaque sheet 26, provide a voltage across the material of the electro-opaque sheet 26. The electrodes 50 and 54 are connected by conductors through the rod 18 and the suspension hinge 22 to the drive electronics that provide a variable voltage to the electrodes 50 and 54. Alternatively, the transparent electrodes 50' and 54' may be located on the first surface 34 of the first clear sheet 14 and the first surface 42 of the second clear sheet. These electrodes 50' and 54' are also connected to the drive electronics by conductors through the rod 18 and the suspension hinge 22. In other embodiments, electrodes are positioned on the periphery of the electro-opaque sheets. In still other embodiments, the electrodes are positioned in just two areas on the electro-opaque sheets.

Figure 2A:
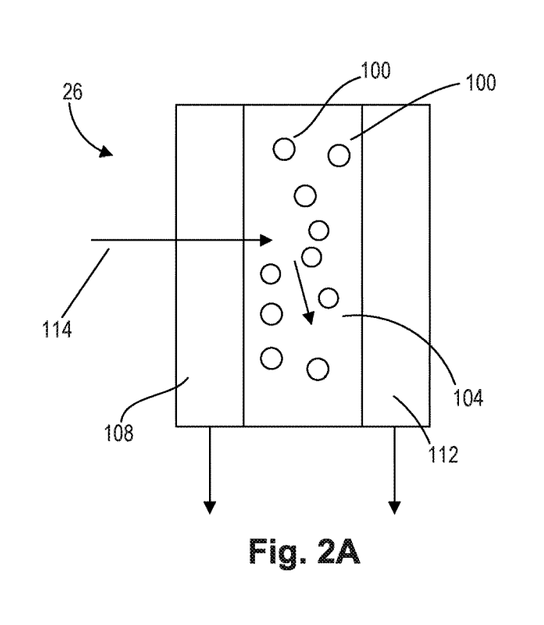
FIG. 2A is a cross-sectional diagram of an embodiment of a suspended particle electro-opaque sheet of an embodiment of the invention in the opaque state.
Figure 2B:
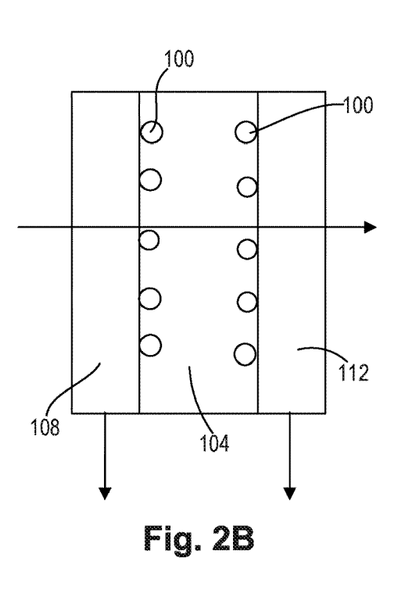
FIG. 2B is a cross-sectional diagram of an embodiment of a suspended particle electro-opaque sheet of an embodiment of the invention in the transparent state.
Figure 2C:
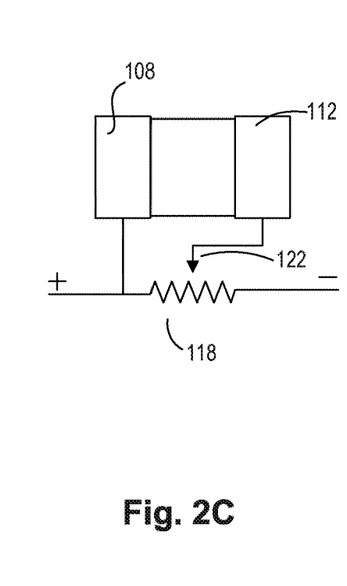
FIG. 2C is a schematic diagram of a control circuit for the embodiment of the suspended particle electro-opaque sheet of FIGS. 2A and 2B.

In one embodiment, the electro-opaque sheet 26 includes a suspended particle device or SPD. Referring to FIG. 2A, a suspended particle device known to the art includes a plurality of charged particles, generally 100, suspended in a fluid 104 such as a thermotropic or lyotropic liquid crystal between two transparent electrodes 108 and 112. When there is no voltage across the electrodes 108 and 112, the particles 100 are randomly distributed throughout the fluid 104 scattering light 114 that is incident on the device. When the voltage across the electrodes 108 and 112 is increased, the charged particles 100 move toward the electrodes 108 and 112 creating spaces through which light can pass (FIG. 2B), thereby becoming transparent. The voltage may be controlled simply by placing a variable resistor 118 across a voltage source such as the automobile battery, and connecting one electrode 108 to one side of the resistor 118 and connecting the other electrode 112 to the movable contact 122 of the variable resistor 118.

Figure 3:
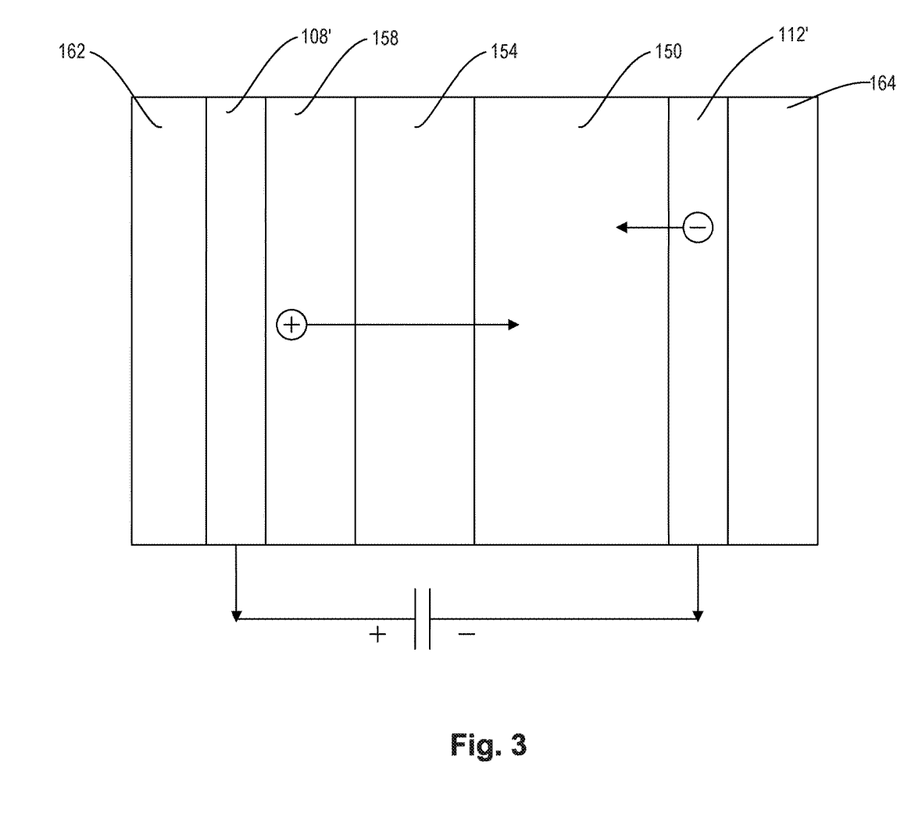
FIG. 3 is a cross-sectional diagram of an embodiment of an electrochromic electro-opaque sheet of an embodiment of the invention.

In another embodiment, the electro-opaque sheet 26 includes an electrochromic device. Referring to FIG. 3, an electrochromic device in one embodiment includes a layer of electrochromic material 150 such as tungsten oxide. On one side of the electrochromic material layer 150 is a transparent electrode 112', while on the other side of the electrochromic material layer 150 is an ion conduction layer 154. Adjacent to the ion conduction layer 154 is an ion storage layer 158. Voltage is applied across the ion storage layer 158 and the other layers by a second electrode 108'. Adjacent to each electrode 108' and 112' is a transparent layer 162 and 164 of polymer or glass. When a voltage is applied across the electrodes 108' and 112', electrons move into the electrochromic material layer 150 while ions move from the ion storage layer 158 through the ion conductor layer 154 to the electrochromic material layer 150 causing a chemical change in electrochromic material thereby causing a change in transparency.

Figure 4:
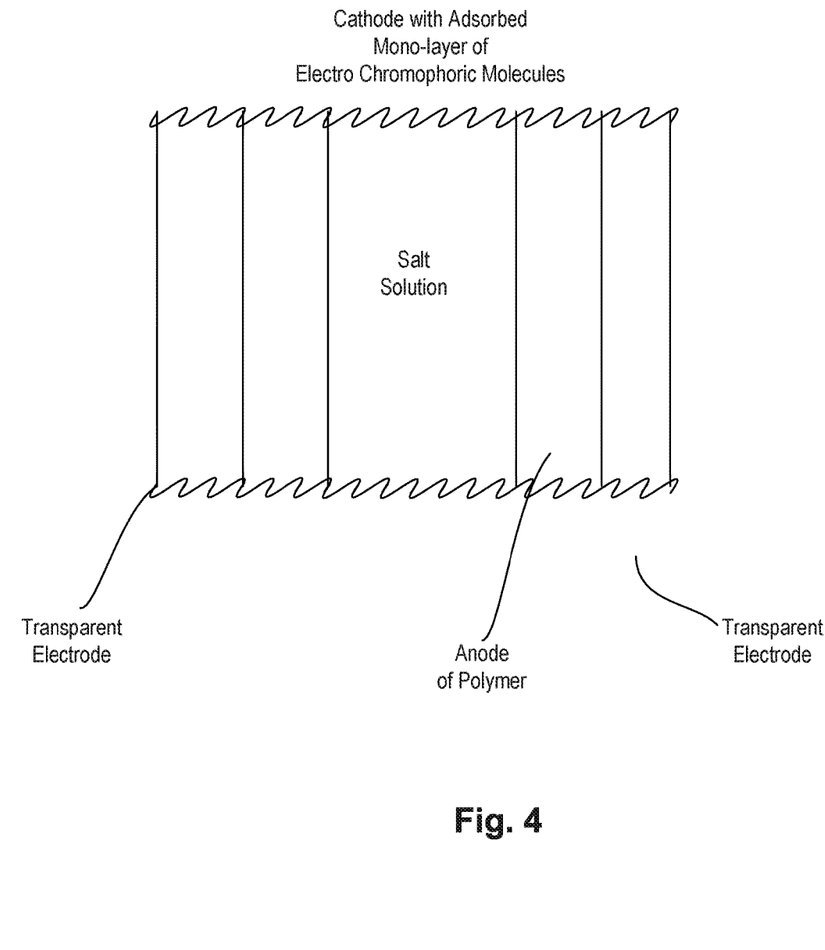
FIG. 4 is a cross-sectional diagram of an embodiment of an electrochromophoric electro-opaque sheet of an embodiment of the invention.

In still another embodiment, the electro-opaque sheet 26 includes an electrochromophoric device. Referring to FIG. 4 the electrochromophoric device includes a material that is naturally photosensitive, darkening upon exposure to UV light. An applied electrical charge realigns the chromophores into a transmissive state. The drive electronics for the electrochromophoric device applies a periodic voltage pulse to the electrochromophoric device. In one embodiment, the voltage pulse is a fixed magnitude (typically about 5V) that is pulse-width modulated to vary the transmissiveness of the material.

Figure 5:
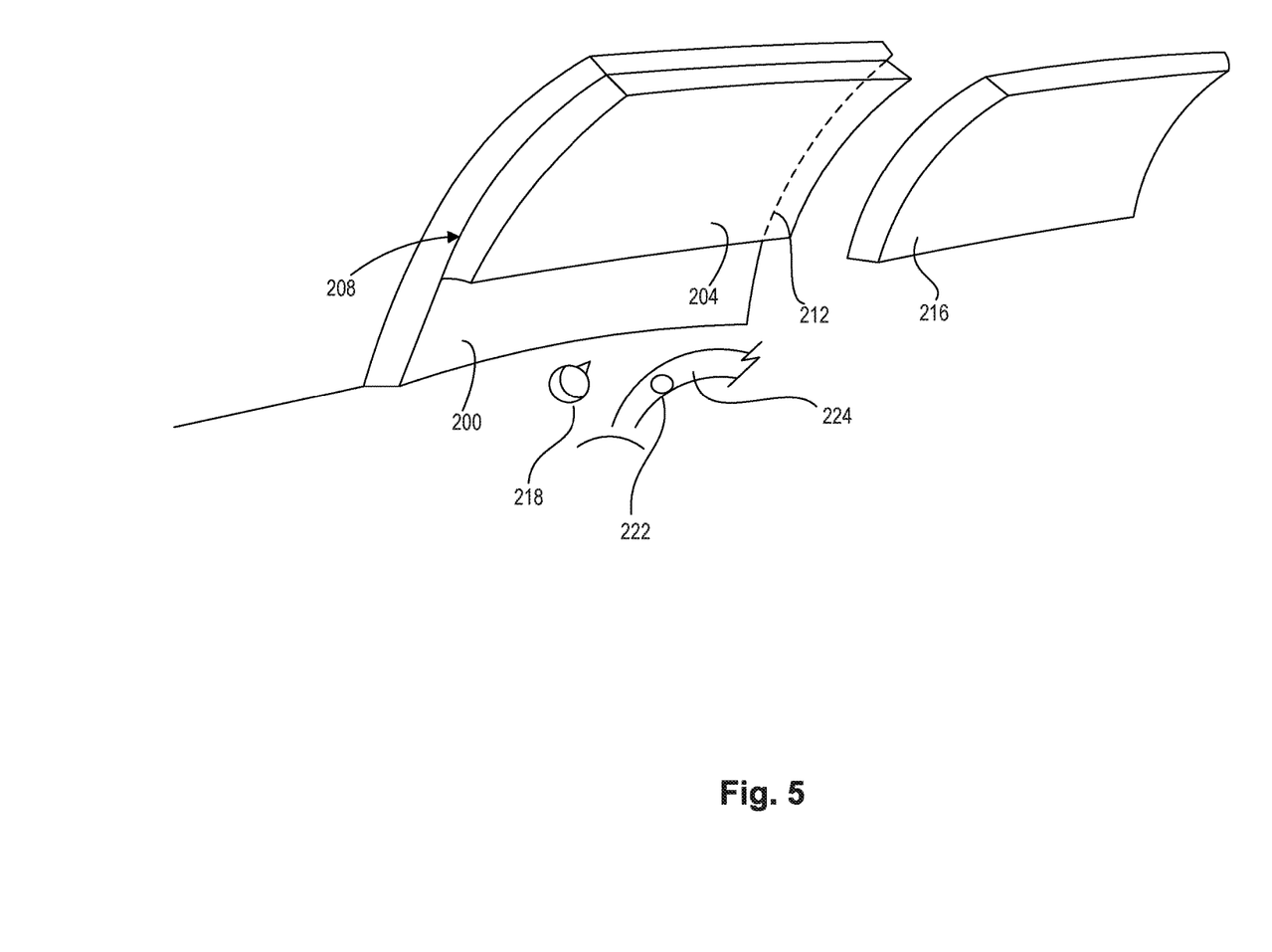
FIG. 5 is a highly schematic exploded diagram of a windshield constructed in accordance with the invention.

The invention also includes a partially dimmable windshield. In one embodiment, the partially dimmable windshield includes a standard windshield 200 to which is affixed an electro-opaque sheet of variable transparency 204. The first surface 208 of the electro-opaque sheet 204 is bonded to only a portion of the windshield 200 as limited by law. Referring to FIG. 5, the second surface 212 of the electro-opaque sheet 204 is then bonded to a clear protective sheet 216 which may be polymer or glass. The electro-opaque sheet 204 changes its transparency in response to a voltage applied across the electro-opaque sheet 204.

Voltage is applied to the electro-opaque sheet through transparent electrodes on the windshield. Drive electronics for controlling the electro-opaque sheet 204 may be located in the dashboard 218 of the automobile, as a button 218 on the steering wheel 224 or as a transparent touch-sensitive surface portion of the visor. For a windshield-affixed visor strip, an electrochromophoric device is preferred as more suited to compound surfaces, has a lower cost, and is laminatable as part of the glass manufacturing process. For the visor application, an SPD device is preferred due to its slightly faster switching time.

Figure 6:
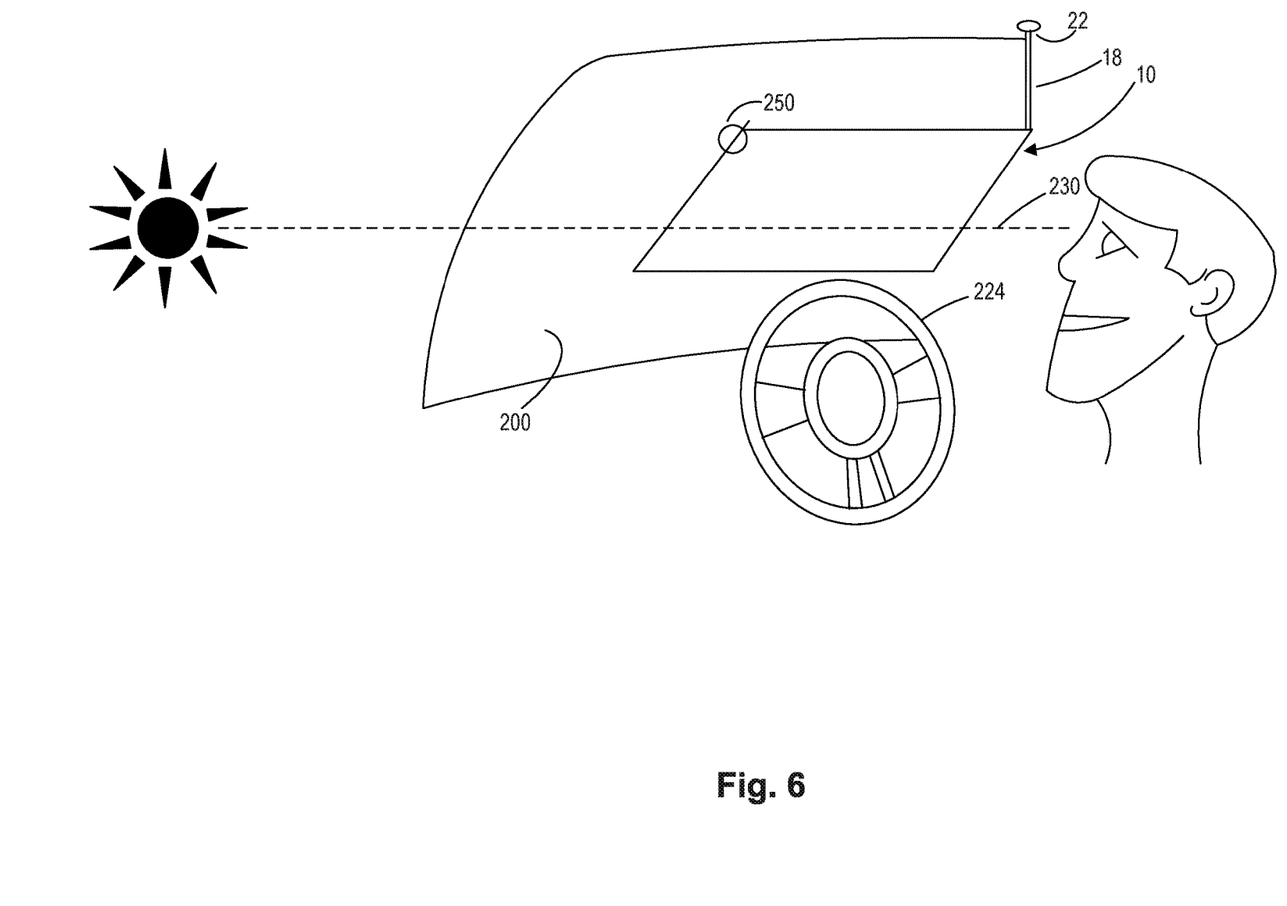
FIG. 6 is a perspective diagram of an embodiment of a passenger compartment of an automobile equipped with an embodiment of the invention.

Referring to FIG. 6, in operation, the driver rotates the visor until the visor is in line 230 between the driver's eyes and the sun. Then the driver uses the user interface to adjust the transparency of the visor. In still another embodiment, the visor includes a photocell 250 which detects the intensity of light entering the windshield 200 as ambient light. The output of the photocell 250 is then used to modulate the voltage across the electro-opaque sheet 26 in the visor 10 to reduce the light entering automobile through the windshield 200. In one embodiment, the transparency is preset to a driver's preference and the ambient light sensors adjust the transparency as a change from the preset value.

Unless otherwise indicated, all numbers expressing lengths, widths, depths, or other dimensions, and so forth, used in the specification and claims are to be understood in all instances as indicating both the exact values as shown and as being modified by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The terms "a," "an," "the," and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed, individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventor for carrying out the spirit of the present disclosure. Of course, variations on these described embodiments will become apparent to those of ordinary skill in the art upon reading the foregoing description. The inventor expects skilled artisans to employ such variations as appropriate, and the inventor intends for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A dimmable visor, comprising:
  a first clear polymer sheet having a first surface;
  a second clear polymer sheet having a first surface;
  an electro-opaque sheet having a first surface and a second surface, and having a variable transparency, the first surface of the electro-opaque sheet being in contact with the first surface of the first clear polymer sheet, the second surface of the electro-opaque sheet being in contact with the first surface of the second clear polymer sheet;
  a pair of transparent electrodes disposed between the first surface of the first clear polymer sheet and the first surface of the electro-opaque sheet and between the first surface of the second clear polymer sheet and the second surface of the electro-opaque sheet, respectively, each of the transparent electrodes having a surface area smaller than that of the electro-opaque sheet;
  and
  a suspension hinge attached to one edge of the first clear polymer sheet, wherein the dimmable visor is configured to rotate about the suspension hinge, and wherein the electro-opaque sheet changes its transparency in response to electrical energy being applied to the electro-opaque sheet.

2. The dimmable visor of claim 1, further comprising drive electronics in electrical communication with the electro-opaque sheet.

3. The dimmable visor of claim 2, further comprising a user interface in electrical communication with the drive electronics.

4. The dimmable visor of claim 1, wherein the electro-opaque sheet comprises a suspended particle device.

5. The dimmable visor of claim 1, wherein the electro-opaque sheet comprises an electrochromic device.

6. The dimmable visor of claim 2, wherein the electro-opaque sheet comprises an electrochromophoric device.

7. The dimmable visor of claim 6, wherein the drive electronics apply a periodic voltage pulse to the electrochromophoric device.

8. The dimmable visor of claim 2, wherein the drive electronics are in electrical communication with one or more photocells.

9. A dimmable windshield, comprising:
  a windshield;

an electro-opaque sheet having a first surface and a second surface, and having a variable transparency, the first surface of the electro-opaque sheet being in contact with the windshield;
a pair of transparent electrodes disposed on two opposite edges of the electro-opaque sheet, each of the transparent electrodes having an area smaller than that of the electro-opaque sheet; and
a clear sheet having a first surface, the first surface of the clear sheet being in contact with the second surface of the electro-opaque sheet, wherein the electro-opaque sheet changes its transparency in response to electrical energy being applied to the electro-opaque sheet.

10. The dimmable windshield of claim 9, further comprising drive electronics in electrical communication with the electro-opaque sheet.

11. The dimmable windshield of claim 10, further comprising a user interface in electrical communication with the drive electronics.

12. The dimmable windshield of claim 11, wherein the user interface is located in a dashboard.

13. The dimmable windshield of claim 11, wherein the user interface is located in a steering wheel.

14. The dimmable windshield of claim 11, further comprising one or more photocells in electrical communication with the drive electronics.

15. The dimmable windshield of claim 9, wherein the clear sheet is a polymer.

16. A vehicle, comprising:
a windshield; and
a dimmable visor comprising:
an electro-opaque sheet having a first surface and a second surface, and having a variable transparency, the first surface of the electro-opaque sheet being disposed on the windshield; and
a pair of transparent electrodes disposed on two opposite edges of the electro opaque sheet, each of the transparent electrodes having an area smaller than that of the electro-opaque sheet; and
a clear sheet having a first surface, the first surface of the clear sheet being in contact with the second surface of the electro-opaque sheet, wherein the electro-opaque sheet changes its transparency in response to electrical energy being applied to the electro-opaque sheet.

17. The vehicle of claim 16, wherein the clear sheet comprises at least one of the pair of transparent electrodes.

18. The vehicle of claim 16, further comprising drive electronics in electrical communication with the electro-opaque sheet.

19. The vehicle of claim 16, further comprising one or more photocells in electrical communication with the drive electronics.

* * * * *